March 10, 1959
E. A. ROCKWELL
2,876,624
HYDRAULICALLY-OPERATED FLUID PRESSURE CONTROL
MEANS AND COMPENSATOR VALVES
Filed April 8, 1953
3 Sheets-Sheet 1
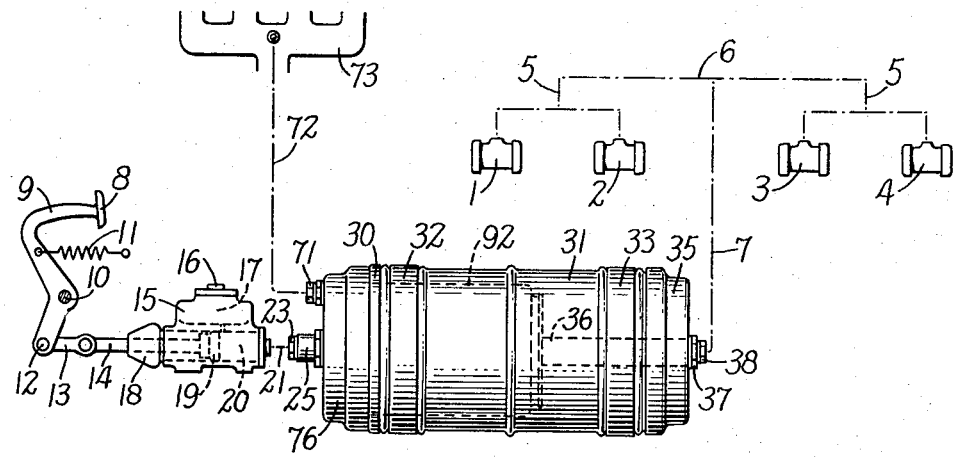
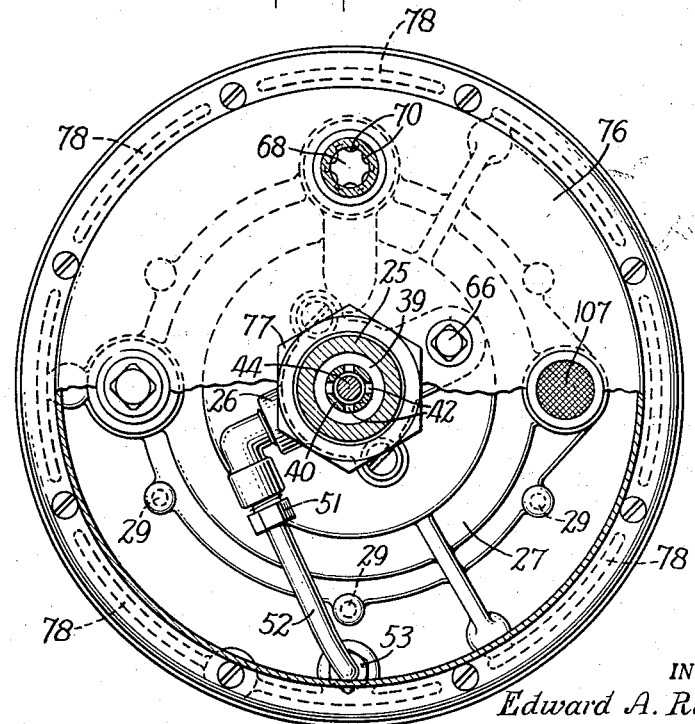
INVENTOR.
Edward A. Rockwell
BY
Arthur Wright
ATTORNEY

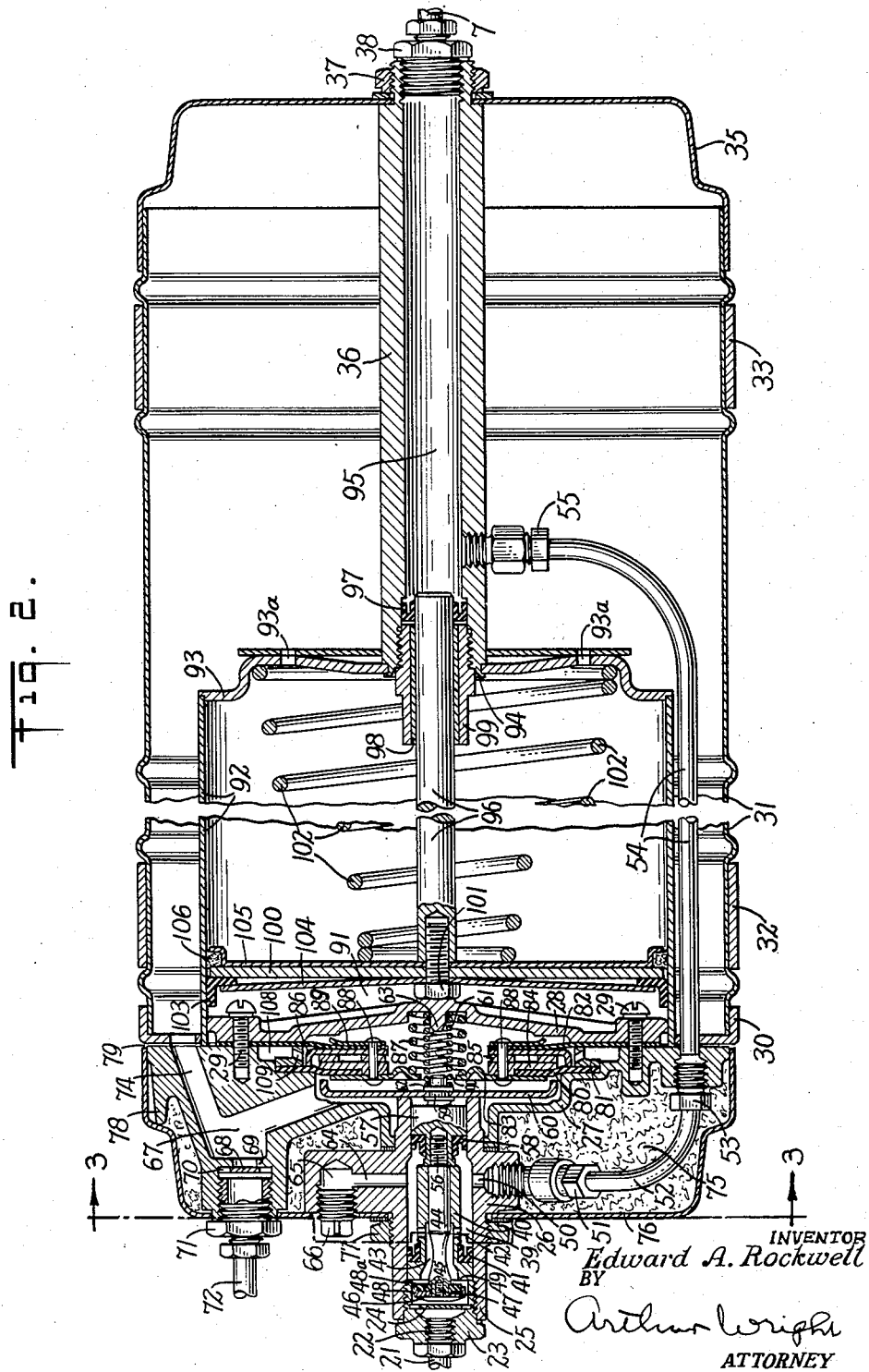

HYDRAULICALLY-OPERATED FLUID PRESSURE CONTROL MEANS AND COMPENSATOR VALVE

Edward A. Rockwell, Los Angeles, Calif.

Original application June 9, 1944, Serial No. 539,584, now Patent No. 2,638,747, dated May 19, 1953. Divided and this application April 8, 1953, Serial No. 347,563

9 Claims. (Cl. 60—54.5)

My invention relates particularly to power units in compact form, that may be used to perform work, as for example in the operation of parts of automotive vehicles, such as brakes, etc.

This application is a division of my copending application upon Pressure Fluid Operated Pressure Intensifier, Ser. No. 539,584, filed June 9, 1944, now Patent No. 2,638,747.

It is a general object of my invention to provide a power unit which is capable of being used advantageously for the operation of any desired part to be moved and which is especially applicable to the operation of brakes in automotive vehicles, such for instance as automobiles, airplanes, etc. Another object of my invention is to provide a power unit in compact form for the operation of any desired part to be moved, as for example on automotive vehicles. Another object is to provide a unit of this character in such a mannner as to obtain an effective ratio of input force to output force.

Another general object of this invention is to provide valve means for the power unit and provide an effective means for obtaining liquid compensation in the parts which operate the valve means. A more specific object is to provide the valve means and the reactive actuating mechanism, in the form of a separate unitary valve assembly, accessibly and conveniently located. Still a further specific object is to locate all of the controlling connections for the power unit at one end thereof. A further object is to locate all of the valves of the unit at the same end thereof. Again, a further object is to avoid the location of any valves in the power plunger.

Further objects of my invention will appear from the detailed description of the same hereinafter.

While my invention is capable of being carried out in many different ways I have shown only certain forms of my invention in the accompanying drawings in which—

Fig. 1 is a diagrammatic representation of an automotive vehicle equipped with my invention;

Fig. 2 is a longitudinal section of a power unit made in accordance with my invention;

Fig. 3 is a transverse vertical section of the power unit shown in Fig. 1, taken on line 3—3 of Fig. 2;

Fig. 4 is a longitudinal section of a modified form of said power unit, shown diagrammatically.

In the drawings, referring to Figs. 1 to 3, I have shown an automotive vehicle having front wheel brake cylinders 1 and 2 and rear wheel brake cylinders 3 and 4 provided with hydraulic branch pipes 5 which are connected together by a hydraulic pipe system 6 having a pipe 7 to receive the hydraulic fluid of any desired character for operating the brake cylinders. On the automobile, there is the usual pedal 8 located on a pedal lever 9 carried by a pivot 10 on the automobile chassis, the same being provided with a retracting spring 11 connected to the chassis. Below the pivot 10 there is a pivotal connection 12 carrying a link 13 which is pivotally connected to the usual master cylinder piston rod 14 passing into a master cylinder 15 having at the upper portion thereof a vented filling cap 16 leading to a reservoir 17 forming a part of the master cylinder 15. Said master cylinder has the usual boot 18 around the piston rod 14, carrying a piston 19 in a cylinder 20 for delivering the hydraulic liquid from the master cylinder by a pipe 21 to an inlet opening 22 in a screw fitting 23, in the power unit.

Thus liquid under controlled pressure from the master cylinder source is led by means of the pipe 21 to the inlet 22 of a unitary valve assembly mounted separately from the power piston 96 of the power unit shown in the drawings. This unitary valve assembly includes the screw fitting 23 which is provided with an apertured baffle 24 and is screw-threaded into a tubular portion 25 of an end casting 26 which is secured in any desired way to a valve casing 27. The valve casing 27 is secured to an apertured spider 28 by screws 29. Adjacent to the valve casing 27 there is a ring 30 to which there is secured an outer shell 31 of a motor having clamping bands 32 and 33 to secure the outer shell 31, in any desired way, at any place on the chassis of the automobile. The other end of the shell 31 has secured thereto a cap 35 located over the end of a hydraulic cylinder 36, where it is secured in place by a nut 37. Within the end of the cylinder 36 there is screw-threaded a fitting 38 which is connected to the pipe 7.

The manually supplied liquid, received in the inlet opening 22 in the fitting 23, passes into a cylinder 39 in which there is located a liquid compensating valve of which a part is a plunger 40 having a U-shaped rubber seal 41. The said plunger 40, furthermore, has a series of radial holes 42 leading to a chamber 43 in the plunger 40 formed by an actuating valve plunger 44 having a reduced end 45, to which there is attached a cut-off valve member 46 by a screw 47 to the end of the valve plunger. The valve member 46 has at its periphery a valve flange 48 and rubber washer 48a which is adapted to seat on a valve seat 49 carried by the end of the plunger 40. In the inner end of the chamber 39 there is a port 50 which leads to by-pass means connecting the inlet 22 (and thus the source of liquid under controlled pressure) with the output of the power piston 96, by way of a fitting 51 and a pipe 52 which has another fitting 53 screw-threaded in the valve casing 27 and at this point the valve casing 27 is secured, in any suitable way, to a pipe 54 which extends inside of the shell 31 to a screw fitting 55 in the side of the cylinder 36. In this manner initially the liquid under manual pressure is delivered to the brake cylinders 1, 2, 3 and 4. Furthermore, the right hand end of the valve plunger 44 has a screw-thread 56 for securing thereto a valve operating plunger 57 carrying a U-shaped rubber seal 58. This valve operating plunger 57, furthermore, has a reduced extension 59 on which there is securely fastened a vacuum controlling admission valve 60 which is normally moved into open position by a small helical spring 61 which seats on a shoulder 62 on the plunger 57 at one end and which, at the other end thereof, is located around a boss 63 on the spider 28. It should also be noted that the casting 26 has a lateral port 64 communicating with an opening 65 which is normally closed by a screw plug 66 but which may, if desired, communicate with the brake system of a trailer. The vacuum which is controlled by the valve 60, is communicated thereto by a passageway 67 in the valve casing 27 and which has therein a check valve 68 cooperating with a valve seat 69. The said check valve 68 has a series of peripheral notches 70 for the passage of the pressure fluid. The vacuum is supplied to the passageway 67 from a screw fitting 71 which communicates by a pipe 72 with a manifold 73 on the engine of the automobile. Furthermore, the said vacuum passageway 67 communicates with a passageway 74 for supplying vacuum to the inside of the shell 31. Between the casting 26 and the valve casing 27 there is an air chamber 75 which may be filled with horsehair, and the said chamber is enclosed by a cover plate 76 which is secured on the outside of the casting 26 by a nut 77 and which rests near its periphery upon a series of fingers 78 formed on the periphery of the valve casing 27. A peripheral gap 79 remains open around the edge of the cover plate 76 for the entry of air from the atmosphere. The vacuum valve 60, when closed, is arranged to seat on a diaphragm 80 which is clamped against the valve casing 27 by a clamping ring 81 which rests against the face of a second diaphragm 82 secured between the valve casing 27 and the spider 28. Mounted on the two diaphragms 80 and 82 there are a clamping ring 83 and a spacing ring 84 having peripheral radial apertures 85, the same being secured together with an air inlet valve 86 and the two diaphragms 80 and 82 as well as a retaining ring 89, by means of rivets 88. A large helical spring 87, supported on the spider 28 at one end and on the ring 83 at the other end, normally moves the air inlet valve 86 outwardly, whereas at other times the air inlet valve at its periphery rests against the diaphragm 80. Also, there is a central opening 90 in the ring 83 to conduct the vacuum, when the valve 60 is open, through the spider 28 to a chamber 91 within a motor power cylinder 92, which is supported at one end thereof by the ring 30. The other end of the cylinder 92 is welded, or otherwise fastened, to a cylinder head 93, having apertures 93a, which is carried in a peripheral recess 94 on the cylinder 36. The said cylinder 36 has a power intensifying chamber 95 in which there is arranged to reciprocate a plunger 96 carrying a U-shaped rubber seal 97, and the plunger 96 is guided within the cylinder 95 by a bushing 98 carried within and secured to a sleeve 99 screw-threaded to the interior of the cylinder 36. The said plunger 96, at the other end thereof, is fastened to a motor piston head 100 by means of a screw 101, and the said piston head 100 is normally moved to the left by means of a helical spring 102 which at the other end rests against the cylinder head 93. The piston head 100 is arranged to fit tightly in the cylinder 92 by means of a leather washed 103 which is retained around the periphery thereof by means of a spring plate or disc 104 carried on the screw 101. Also carried on the screw 101 there is a dished retainer plate 105 which supports around its periphery a felt ring 106. As shown in Fig. 3, the air which enters the chamber 75 passes therefrom through a screen 107, located near the periphery of the valve casing 27 so that the air therefrom can reach an annular chamber 108 which communicates by air passages 109 with the outer face of the air inlet valve 86, so that the said air, when admitted, beneath the periphery of the valve 86, can pass by the passages 85 through the spider 28 and thence to the chamber 91 so as to act upon the face of the piston head 100.

Figure 4:
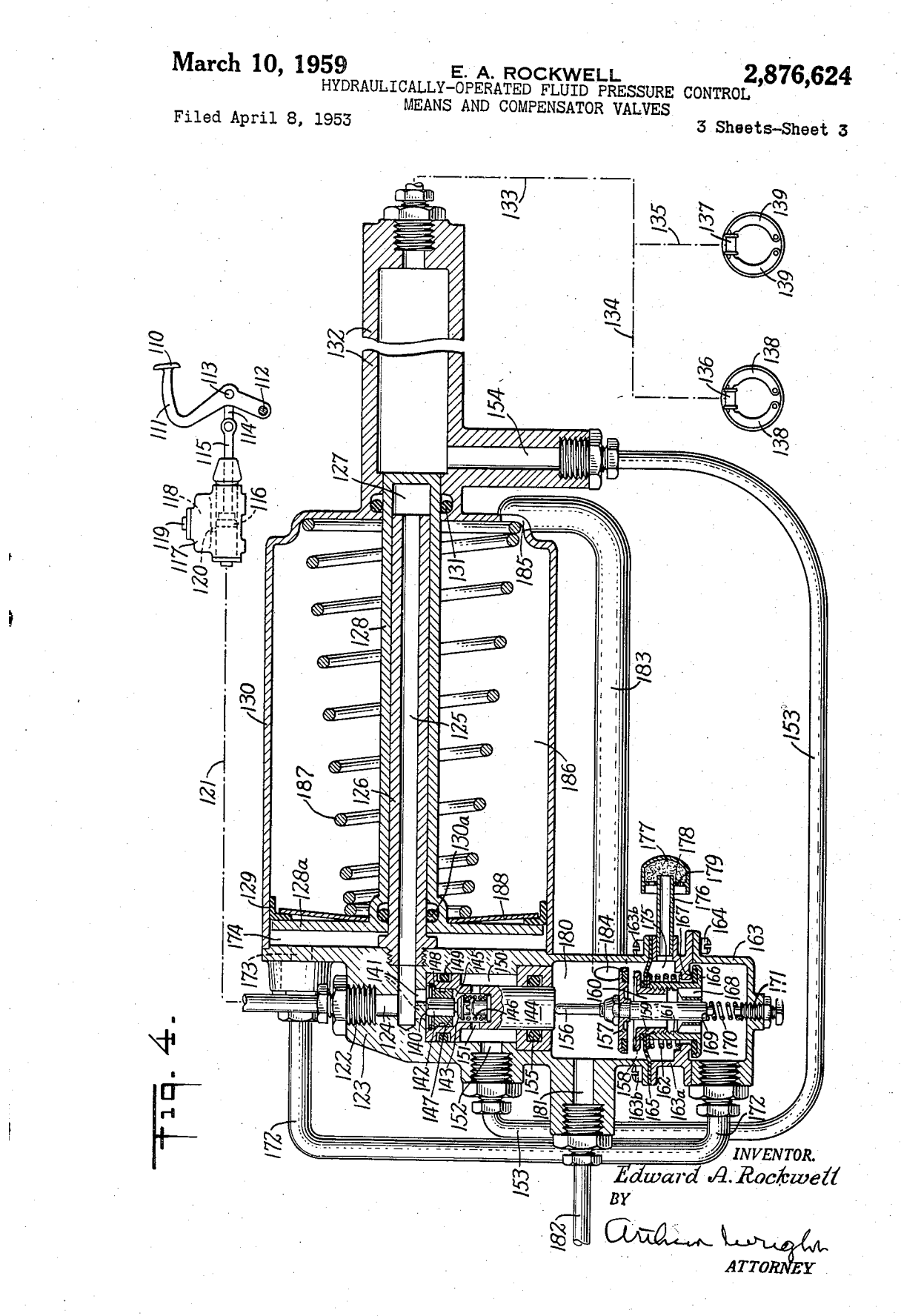

In the modification of my invention in Fig. 4, there is shown diagrammatically a modified form of the power unit for operating the wheel brakes on an automotive vehicle. As shown therein, I have provided a pedal 110 carried by a pedal lever 111 mounted on a pivot 112 carried by the chassis of an automobile. The lever 111 has a pivot 113 for a link 114 which is connected to a piston rod 115 having a piston 116 operating in a master cylinder 117. The master cylinder has the usual reservoir 118 provided with a vented filling cap 119 and a liquid compensation port 120 to supply liquid within the master cylinder 117 in the retracted position of the piston 116. The master cylinder 117 is connected by a pipe 121 to an inlet opening 122 in a valve casing 123 which is provided with a chamber 124 which connects with a passageway 125 in a monitor piston 126 screw-threaded into the side of the valve casing 123. The passageway 125 communicates with a chamber 127 in the end of a hollow plunger 128 having a piston 128a which is provided with a leather sealing ring 129 fitting within a power cylinder 130. The plunger 128 has an internal annular seal 130a.

The plunger 128, also, has a rubber seal 131 carried by a cylinder 132. Beyond the right-hand end of the plunger 128 there is the hydraulic pressure increasing cylinder 132 forming a part of the cylinder 130, the cylinder 132 being connected by a pipe 133 to branch pipes 134 and 135 leading to brake cylinders 136 and 137 respectively, which are connected, respectively, to brake shoes 138 and 139 on the rear wheels of the automobile. It will be understood, of course, that similar branch pipes and brake cylinders may be connected to the pipe 133 leading to front wheel brakes on the automobile, if desired.

Within the chamber 124 in the fitting 122 there is also provided a valve stop 140 adjacent to apertures 141. The said stop 140 cooperates with a web 142 which is attached to a valve 143 in the upper or retracted position of a plunger 144. The valve 143 is located in a recess 145, having a helical spring 146 to normally seat the valve 143 against a valve seat 147, in a plunger head 148 screw-threaded to the plunger 144. The plunger head 148, furthermore, has a rubber seal 149 operating within a chamber 150 in the valve casing 123. Communicating with the chamber 150 there are a plurality of radial ports 151 leading to the recess 145. Furthermore, the said chamber 150 has a lateral port 152 which communicates with a pipe 153 leading to a port 154 in the pressure increasing cylinder 132. At its lower end the plunger 144 passes through a seal 155 in the valve casing 123 and contacts with a valve stem 156 on which there is carried a vacuum valve 157 adapted to seat on a valve seat 158 carried by a screw ring 159 having a series of internal flutings 160 for guiding the valve stem 156. The valve ring 159, furthermore, is screw-threaded to an air inlet valve member 161 normally pressed upwardly by a helical spring 162 seated within a spacing ring 163a secured by screws 163b to the valve casing 123 and to a cap 163 by screws 164. Between the spacing ring 163a and the valve casing 123 there is clamped, at its outer periphery, a diaphragm 165, the inner periphery thereof being clamped between the screw ring 159 and the air inlet valve member 161. It will be noted, furthermore, that the air inlet valve member 161 has a flange valve 166 which cooperates with a valve seat 167 on the spacing ring 163a and that the said valve member 161 has a series of longitudinal passageways 168 to act to permit the passage of air. On the stem 156 there is a shoulder 169 supporting a helical spring 170, the lower end of which is supported by an adjusting screw 171 screw-threaded in the cap 163. The cap 163, furthermore, is connected by a pipe 172 to an inlet 173 leading to a chamber 174 in the power cylinder 130. Also, within the spacing ring 163a there is a chamber 175 having an air inlet pipe 176 covered by a cap 177 supported therefrom by a spider ring 178 having air inlet apertures 179. The valve casing 123 has a vacuum chamber 180 which communicates by a port 181 with a pipe 182 which is connected to the manifold of the automobile engine. Also, said valve casing has a vacuum pipe connection 183 leading from a port 184 in the valve casing 123 to a port 185 in a vacuum chamber 186, at the right of the piston 128a, in which there is located a helical spring 187 supported at one end by the cylinder 130 and at the other end against a ring 188 which is pressed by the spring 187 against the leather washer 129 to retain it in place.

In the operation of the form of my invention shown in Figs. 1, 2 and 3, assuming that the motor of the automobile is in operation and that a vacuum is accordingly supplied to the pipe 72, when manual pressure is applied to the pedal 8, this operates the piston 19 in the master cylinder 15 so as to apply hydraulic fluid under controlled pressure through the pipe 21 to the inlet 22 on the power unit. This will first supply the pressure fluid around the valve 48, 49 into the chamber 43 and thence through the ports 42 and by-pass means to the chamber 39 and from this chamber through the pipe 7 to the brake cylinders 1, 2, 3 and 4 so as to be applied to the brake cylinders 1, 2, 3 and 4 on the four wheels of the automobile. It will be understood that some braking force can be applied manually in this way, if desired, particularly if the power mechanism for any reason fails to operate, as for instance when a failure of vacuum should occur. As the manual pressure is increased, however, this results in closing the cut-off valve 48, 49 on the sleeve 40, thereby cutting off the communication of the liquid from the inlet 42 to the chamber 39 and moving the sleeve 40 and plunger 57 rearwardly.

Upon admission of power, in the present instance air under atmospheric pressure, to the vacuum submerged piston 100, the plunger 96 moves to apply output pressure to the individual wheel brake cylinders. Thus the actuating plunger 57 upon rearward movement closes the vacuum admission valve 60 and thereafter unseats the air inlet valve 86 which admits air through the air inlet 107 from around the edge of the cover 76. This will admit a controlled amount of air through the spider 28 to the chamber 91 within the cylinder 92. Inasmuch as, previously, the piston 100 has been submerged in a vacuum and as this admission of air admits controlled air pressure to the left face thereof, the plunger 96 will move to the right in the chamber 95 so as to produce an intensified pressure in the latter, which is thence conveyed by the pipe 7 to the wheel brake cylinders. During this time it will be understood, also, that the amount of pressure applied through the pipe 7, whether manually or by means of power or both, to the brake cylinders 1, 2, 3, 4 will be felt on the pedal 8 by the operator thereof by reason of the pipe connections 52, 54 operating in connection with the differential plungers 40 and 57, thus obtaining, also, a definite ratio of input to output force. In other words, the brakes can, thus, be controlled manually so as to apply the manual pressure or pressure derived from the power means in modulated amounts, according to the on or off-modulation of the valves 60, 86, which are arranged to be self-lapping so that both of said valves are in closed position before any change in the direction of movement thereof, to admit more air through the air inlet 107 past the air inlet valve 86, or to apply more vacuum past the valve 60. It will be noted, furthermore, that in the apparatus the cut-off valve 48, 49 as well as the modulating valves 60, 86 are located at the same end of the structure, so that the construction is accordingly greatly simplified and the connections thereto can be more readily made when installing the unit on the chassis of the automobile.

In the modification of my invention shown in Fig. 4, the operation is somewhat similar and there is a further simplification in mounting the cut-off valve 143 and the modulating valves 157 and 161 altogether on one end of the power unit. In this instance, when manual pressure is applied to the pedal 110 the master cylinder 117 supplies the fluid under pressure through the pipe 121 to the inlet 122 where initially the liquid passes through the recesses 141 adjacent to the stop 140 which, in the initial retracted position of the plunger 144, retains the valve 143 open by reason of the web 142. The liquid, thus, under manual pressure, passes into the chamber 145 through the radial ports 151 and thence into the chamber 150 and by the pipe 153 to the cylinder 132 and thence through the pipe 133 to the brake cylinders 136 and 137, thus setting the brakes. Upon the increase of the manual pressure the plunger 144 is moved forwardly, thus closing the valve 143 and thereafter moving the vacuum outlet valve 157 into closed position followed by the opening of the air inlet valve 166 which admits air from the pipe 176 past the valve 166 into the pipe 172 and thence into the chamber 174 in the power cylinder 130. The piston 128, having been previously submerged in a vacuum, is now moved to the right by the air pressure in the chamber 174, thus moving the end of the said piston into the cylinder 132 and producing an intensified pressure which is supplied by the pipe 133 to the brake cylinders 136, 137. This application of the intensified pressure is, thus, controlled in modulating amounts by the operation of the valves 157 and 161, which are self-lapping so that they are both closed in changing from a position in which both valves are closed to a position where more air is admitted to apply greater braking force, or to a position where more vacuum is admitted to apply a lessened braking force. Throughout the application of manual force or intensified pressure from the cylinder 132, there will be a coordinate feel sensed by the operator on the pedal 110, according to the amount of braking force applied. Also, in this form of my invention there is provided a coordination of the travel of the pedal with the amount of travel of the brake operating elements by reason of the monitor chamber 127, for the reason that as the piston 128 moves towards the right a coordinate amount of fluid is drawn into the chamber 127 so that the operator of the pedal 110 not only has a feel but also senses the change of position which is coordinate to the amount of braking pressure and intensified pressure liquid supplied to the brakes. In this construction it will be noted that all the valves are conveniently located on one end closure for the power cylinder. Also, in this instance, the reaction is felt on the manual means from both the modulating valves and the hydraulic power pressure exerted on the brakes.

To summarize the operation of the invention as illustrated in Fig. 4, although the invention as shown in Fig. 2 operates in a similar manner, the control valve means 157 for regulating the supply of vacuum and air to the power unit is actuated by a control plunger 144. This plunger is located in a plunger cylinder in the by-pass conduit, which conduit includes a line section 153 extending to the brake lines. This conduit conveys fluid from the master cylinder around the power unit. A compensating valve element 142 regulates the flow through the by-pass conduit, which flow passes from the master cylinder; through the line 121; the ports 141; past the valve stem webs 142 and the head of the valve element (until it has closed when the plunger moves); out the radial ports 151 and then through the section of line 153 of the brake lines.

The valve element 142 allows flow from the master cylinder until a predetermined make-up pressure is established in the lines, whereupon the plunger moves to actuate the air and vacuum control valve. At the same time, as an incident to movement of the control plunger, the compensating valve element 142 is seated to prevent return flow. In seating it traps fluid between the control plunger and the master cylinder, and the valve element is subject both to the pressure of the trapped fluid, and the pressure of the fluid in the brake lines, in the same manner as the plunger.

While I have described my invention above in detail I wish it to be understood that many changes may be made therein without departing from the spirit of the same.

I claim:

1. In a hydraulic control system for a hydraulic device, said system having lines filled with fluid and leading to the hydraulic device, and a source of power, the combination comprising, a manually operated hydraulic master cylinder, a power unit for applying pressure to the fluid in the lines, control valve means connected to said source for directing power to said power unit, a conduit for conveying fluid around the power unit between said master cylinder and the lines, compensating valve means in said conduit for controlling the flow of fluid therethrough, said compensating valve means including a valve element subject to the pressure in the conduit and movable in the direction of flow of fluid displaced by the master cylinder to open the conduit and pass fluid into the lines until a predetermined make-up pressure is established, means defining a plunger cylinder in said conduit having a plunger subject to the pressure developed therein by the master cylinder and the pressure of fluid in the lines so as to be movable in response to fluid displaced by the master cylinder, means connecting said plunger to said control valve means for actuating the latter causing the power unit to vary the pressure in the lines, and means connecting said plunger to said compensating valve element for moving the same in the opposite direction to close the conduit and prevent return flow upon pressure in the lines reaching said make-up pressure.

2. In a hydraulic control system for a hydraulic device, said system having lines filled with fluid and leading to the hydraulic device, and a source of power, the combination comprising, a manually operated hydraulic master cylinder, a power unit for applying pressure to the fluid in the lines, control valve means connected to said source for directing power to said power unit, a conduit for conveying fluid around the power unit between said master cylinder and the lines, compensating valve means in said conduit for controlling the flow of fluid therethrough, flow from the master cylinder upon actuation thereof tending to unseat the valve element to open the conduit and pass fluid into the lines until a predetermined make-up pressure is established, means defining a plunger cylinder in said conduit having a plunger subject to the pressure therein developed by the master cylinder and the pressure in the lines so as to be movable in response to application of the master cylinder, means connecting said plunger to said control valve means for actuating the latter causing the power unit to vary the pressure in the lines, and means connecting said plunger to said compensating valve element for moving the same in the opposite direction to close the conduit and prevent return flow upon pressure in the lines reaching said make-up pressure.

3. In a pedal operated booster system for a vehicle having hydraulic brake operating means, said system having lines filled with brake fluid leading to said brake operating means, and a source of pressure differing from the atmosphere, the combination comprising: a pedal operated hydraulic master cylinder; a power unit for applying pressure to the brake fluid in the lines; control valve means connected to said source for directing pressure to said power unit; means for operating the control valve means by movement of the pedal including a plunger cylinder connected to the master cylinder and the brake lines and having a hollow movable plunger, a compensating valve element carried by the plunger to control the flow therethrough, said valve element being movable to a closed position at a predetermined make-up pressure for trapping fluid between said master cylinder and the hollow plunger for operating the latter by the trapped fluid, and for preventing return flow from the lines, said plunger being subject when said valve element is closed to pressure in the lines, said hollow plunger being moved by continued movement of the pedal causing the master cylinder to apply pressure to the trapped fluid and having an operative connection to the control valve means so that such movement of the plunger actuates the latter.

4. In a hydraulic control system for a hydraulic device, said system having lines filled with fluid and leading to the hydraulic device, and a source of power, the combination comprising, a manually operated hydraulic master cylinder, a power unit for applying pressure to the fluid in the lines, control valve means connected to said source for directing power to said unit, a conduit for conveying fluid around the power unit between said master cylinder and the lines, compensating valve means in said conduit for controlling the flow of fluid therethrough, flow from the master cylinder upon actuation thereof tending to unseat the valve element to open the conduit and pass fluid into the lines until a predetermined make-up pressure is established, means defining a plunger cylinder in said conduit having a differential plunger presenting opposing effective areas, one of which is subject to the pressure in the lines and the other of which is subject to the pressure developed in the conduit by the master cylinder, the last-mentioned area being larger than the first-mentioned area so that the plunger will be movable in response to the master cylinder, means connecting said plunger to said control valve means for actuating the latter causing the power unit to vary the pressure in the lines, and means connecting said plunger to said compensating valve element for moving the same in the opposite direction to close the conduit and prevent return flow upon pressure in the lines reaching said make-up pressure.

5. In a pedal operated booster system for a vehicle having hydraulic brake operating means, and a source of pressure differing from the atmosphere, the combination comprising, a pedal operated hydraulic master cylinder, a power unit having a plunger for developing a brake fluid pressure, control valve means connected to said source and to said master cylinder for directing pressure from said source to said power unit for incrementally increasing said brake fluid pressure upon increments of pedal movement, means for operating said control valve means, including a plunger cylinder connected to the master cylinder and the brake operating means and having a movable plunger conected to the control valve means, said plunger having effective areas subject to the pressures of the brake operating means and master cylinder respectively and a passage connecting said effective areas, a compensating valve element to control the flow through said passage and movable in the direction of flow of fluid displaced by the master cylinder upon initial application thereof to allow flow through the passage until a predetermined make-up pressure is established in the lines and the brake operating means, said plunger being operated by continued movement of the pedal causing the master cylinder to displace fluid, to actuate said valve means.

6. In a hydraulic braking system for a vehicle having hydraulic brake operating means, said system having lines filled with fluid, and a source of power, the combination comprising: a manually operated hydraulic master cylinder; power means for applying pressure to the fluid in the lines leading to said brake operating means, said power means including a cylinder connected to the lines, a small piston therein, a power cylinder, a power piston in said power cylinder, and means connecting said pistons; control valve means connected to said source and operated by said master cylinder for directing power to the power piston; a by-pass conduit for conveying fluid around the power means between the master cylinder and the lines leading to the brake operating means; means defining a plunger cylinder in said by-pass conduit having a plunger, said plunger being subjected to and movable in response to fluid pressure established by the master cylinder; a compensating valve element movably mounted relative to its seat to control the flow through said by-pass conduit; said valve element being subjected to the pressure established by the master cylinder and being mounted for movement in a direction away from its seat upon initial application of the master cylinder to pass fluid until a predetermined make-up pressure is established in the lines; means operatively connecting said plunger to said compensating valve element for moving the same onto its seat to close the by-pass conduit upon pressure in the lines reaching said make-up pressure to prevent return flow; and means for transmitting movement of said plunger to said control valve means for actuating the latter causing the power means to increase the pressure in the lines upon continued application of the master cylinder, which increased pressure in the lines is applied to the plunger via the by-pass conduit so as to yieldingly resist movement of the same and providing a follow-up action.

7. In a hydraulic braking system for a vehicle having hydraulic brake operating means, said system having lines filled with brake fluid and leading to said brake operating means, and a source of pressure differing from the atmosphere, the combination comprising: a pedal-operated hydraulic master cylinder; a power unit for applying pressure to the brake fluid in the lines; control valve means connected to said source for directing pressure from said source to said power unit; means connected to said master cylinder for operating said control valve means upon movement of the pedal including a by-pass conduit for conveying fluid around the power unit into the brake lines from the master cylinder, a plunger cylinder connected in the by-pass conduit having a differential plunger with effective areas subject to the fluid pressure developed in the conduit by the master cylinder and in the lines respectively, the latter area being smaller, so that the plunger will be movable in response to the master cylinder to operate the control valve means and cause the power unit to vary the pressure in the lines; and a normally open compensating valve operatively connected to said plunger and arranged for controlling the flow through the by-pass conduit, said compensating valve including a valve element mounted to allow flow from the master cylinder into the lines until a predetermined make-up pressure is established, and movable to a closed position to prevent return flow as an incident to movement of the plunger caused by the establishing of said predetermined make-up pressure in the by-pass conduit and lines.

8. In a hydraulic braking system for a vehicle having hydraulic brake operating means, said system having lines filled with brake fluid and leading to said brake operating means, and a source of power, the combination comprising: a pedal operated hydraulic master cylinder; a power unit for applying pressure to the brake fluid in the lines; control valve means connected to said source and actuable to direct power to said power unit; means for operating the control valve means by movement of the pedal including a by-pass conduit for conveying fluid around the power unit between the master cylinder and the lines, a plunger cylinder in said by-pass conduit having a plunger subject to the pressure of fluid in the conduit, said plunger being moved by initial movement of the pedal and fluid displaced by the master cylinder and having a connection so that such movement of the plunger actuates said control valve means, said plunger including a passage for allowing fluid to flow therethrough which passage is in communication with the by-pass conduit, a compensating valve element to control the flow through said passage movable in the direction of flow of fluid displaced by the master cylinder to allow flow through the passage until a predetermined make-up pressure is established in the lines, and movable to a closed position to prevent return flow as an incident to such movement of the plunger, the opposite sides of said plunger being subject to the pressure in the conduit developed by the master cylinder and the pressure in the lines, respectively, so that the plunger is operated by continued movement of the pedal causing fluid to be displaced by the master cylinder, to actuate the valve means.

9. In a hydraulic braking system for a vehicle having hydraulic brake operating means, said system having lines filled with brake fluid and leading to said brake operating means, and source of power, the combination comprising: a pedal operated hydraulic master cylinder; a power unit for applying pressure to the brake fluid in the lines; control valve means connected to said source and actuable to direct power to said power unit; means for operating the control valve means by movement of the pedal including a by-pass conduit for conveying fluid around the power unit between the master cylinder and the lines, a plunger cylinder in said by-pass conduit having a plunger subject to the pressure of fluid in the conduit, said plunger being moved by initial movement of the pedal and fluid displaced by the master cylinder and having a connection so that such movement of the plunger actuates said control valve means, said plunger including a passage for allowing fluid to flow therethrough which passage is in communication with the by-pass conduit and the master cylinder, a compensating valve element carried by said plunger to control the flow through said passage, said compensating valve being movable to a closed position at a predetermined make-up pressure for trapping fluid between said master cylinder and the plunger for operating the latter by the trapped fluid, said plunger being operated by continued movement of the pedal causing the master cylinder to apply pressure to the trapped fluid, said plunger during such operation being subject to the pressure in the lines, to actuate the control valve means.

References Cited in the file of this patent

UNITED STATES PATENTS

| | | |
|---|---|---|
| 1,903,973 | Boughton | Apr. 18, 1933 |
| 2,275,697 | Stelzer | Mar. 10, 1942 |
| 2,328,637 | Freeman | Sept. 7, 1943 |
| 2,353,755 | Price | July 18, 1944 |
| 2,373,272 | Stelzer | Apr. 10, 1945 |
| 2,393,524 | Fant | Jan. 22, 1946 |
| 2,399,270 | Vickers | Apr. 30, 1946 |
| 2,433,953 | Ingres | Jan. 6, 1948 |
| 2,476,089 | Gunderson | July 12, 1949 |

FOREIGN PATENTS

| | | |
|---|---|---|
| 835,760 | France | Oct. 3, 1938 |